United States Patent
Ichikawa et al.

(10) Patent No.: US 8,842,932 B2
(45) Date of Patent: Sep. 23, 2014

(54) IMAGE PROCESSING APPARATUS, IMAGE PROCESSING METHOD, AND RECORDING MEDIUM RECORDING A PROGRAM

(75) Inventors: Erina Ichikawa, Sagamihara (JP); Jun Muraki, Hamura (JP); Hiroshi Shimizu, Akishima (JP); Hiroyuki Hoshino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 489 days.

(21) Appl. No.: 13/158,614

(22) Filed: Jun. 13, 2011

(65) Prior Publication Data

US 2011/0311159 A1    Dec. 22, 2011

(30) Foreign Application Priority Data

Jun. 18, 2010    (JP) .................................. 2010-139026

(51) Int. Cl.
 G06K 9/40    (2006.01)
 G06K 9/00    (2006.01)
(52) U.S. Cl.
 CPC ........ *G06K 9/00248* (2013.01); *G06K 9/00604* (2013.01)
 USPC ........... 382/275; 382/117; 382/118; 382/274; 340/5.1; 340/5.53
(58) Field of Classification Search
 USPC ......... 382/115, 117, 118, 274, 275, 282, 178; 340/5.1, 5.53, 5.83
 See application file for complete search history.

(56) References Cited

U.S. PATENT DOCUMENTS

| | | | | |
|---|---|---|---|---|
| 6,499,843 | B1 * | 12/2002 | Cox et al. | 351/246 |
| 6,504,546 | B1 * | 1/2003 | Cosatto et al. | 345/473 |
| 6,919,892 | B1 * | 7/2005 | Cheiky et al. | 345/473 |
| 7,027,054 | B1 * | 4/2006 | Cheiky et al. | 345/473 |
| 7,245,449 | B2 * | 7/2007 | Stein et al. | 360/65 |
| 7,734,098 | B2 | 6/2010 | Kikkawa et al. | |
| 7,819,818 | B2 * | 10/2010 | Ghajar | 600/558 |
| 8,315,433 | B2 * | 11/2012 | Hsu et al. | 382/104 |
| 8,384,793 | B2 * | 2/2013 | Ciuc et al. | 348/222.1 |
| 8,553,037 | B2 * | 10/2013 | Smith et al. | 345/473 |
| 2004/0208114 | A1 | 10/2004 | Lao et al. | |
| 2008/0118156 | A1 | 5/2008 | Okada | |

FOREIGN PATENT DOCUMENTS

| | | |
|---|---|---|
| CN | 1522052 A | 8/2004 |
| CN | 1648934 A | 8/2005 |
| CN | 101188677 A | 5/2008 |
| JP | 2000-267156 A | 9/2000 |

(Continued)

OTHER PUBLICATIONS

Chinese Office Action dated Aug. 13, 2012 (and English translation thereof) in counterpart Chinese Application No. 201110158752.7.

(Continued)

*Primary Examiner* — Yosef Kassa
(74) *Attorney, Agent, or Firm* — Holtz Holtz Goodman & Chick PC

(57) ABSTRACT

An image processing apparatus includes an obtainment section to obtain a face image; an area specifying section to specify a set of a plurality of corresponding areas in the face image obtained by the obtainment section; and a correction section to generate a face image in which one area of the plurality of corresponding areas of the face image is used as a reference to correct another area.

10 Claims, 10 Drawing Sheets

(56) References Cited

FOREIGN PATENT DOCUMENTS

| | | |
|---|---|---|
| JP | 2009-223566 A | 10/2009 |
| JP | 2009-245166 A | 10/2009 |
| JP | 2009-265726 A | 11/2009 |

OTHER PUBLICATIONS

Japanese Office Action dated Apr. 10, 2012 (and English translation thereof) in counterpart Japanese Application No. 2010-139026.

* cited by examiner

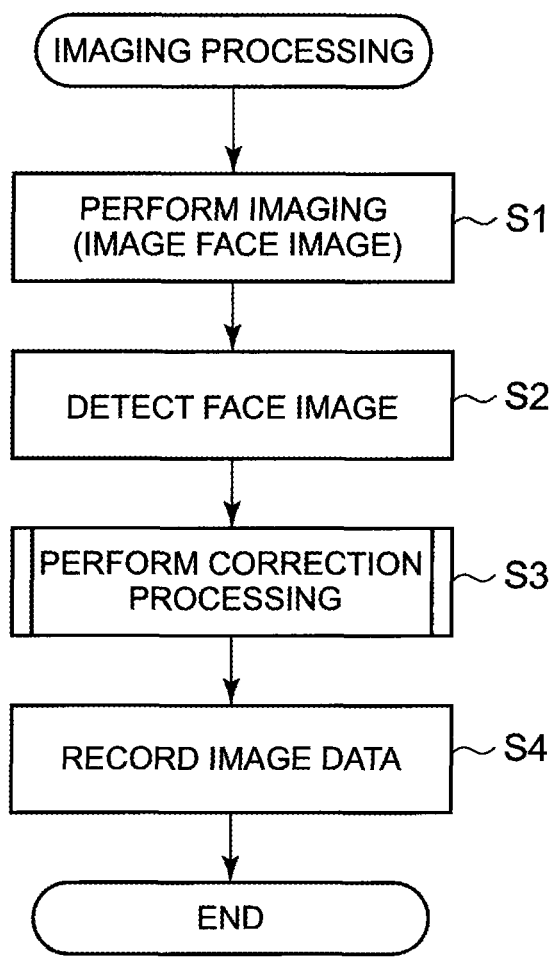

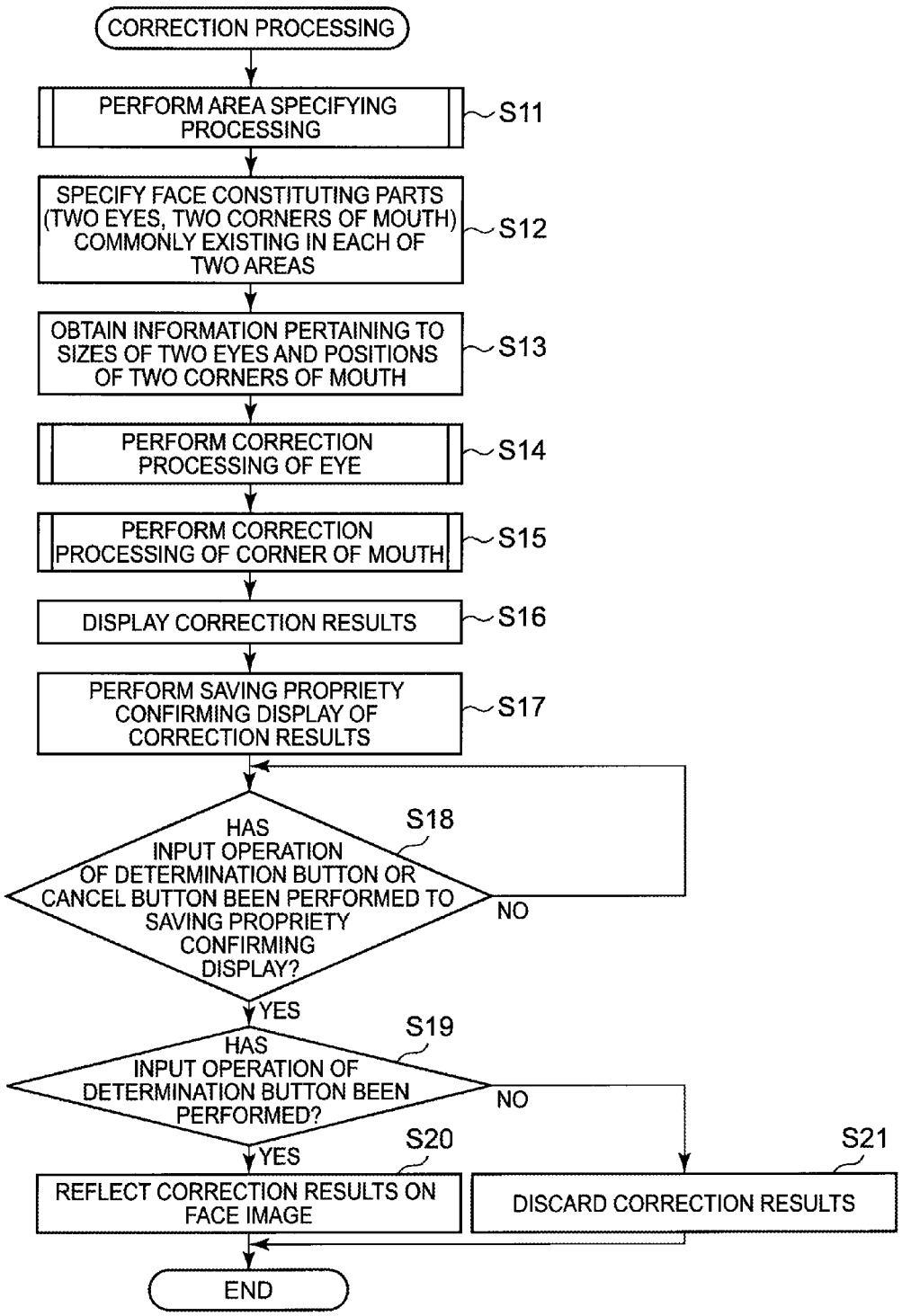

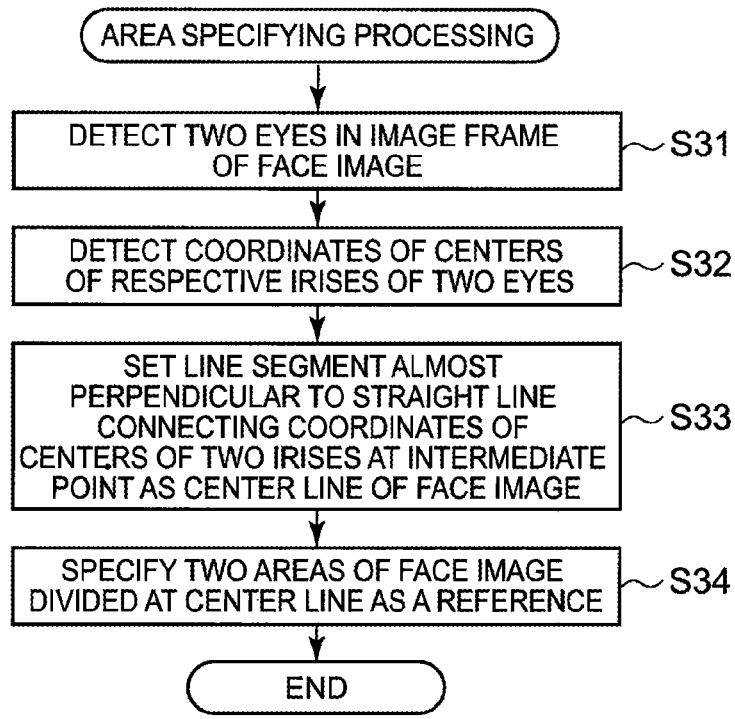
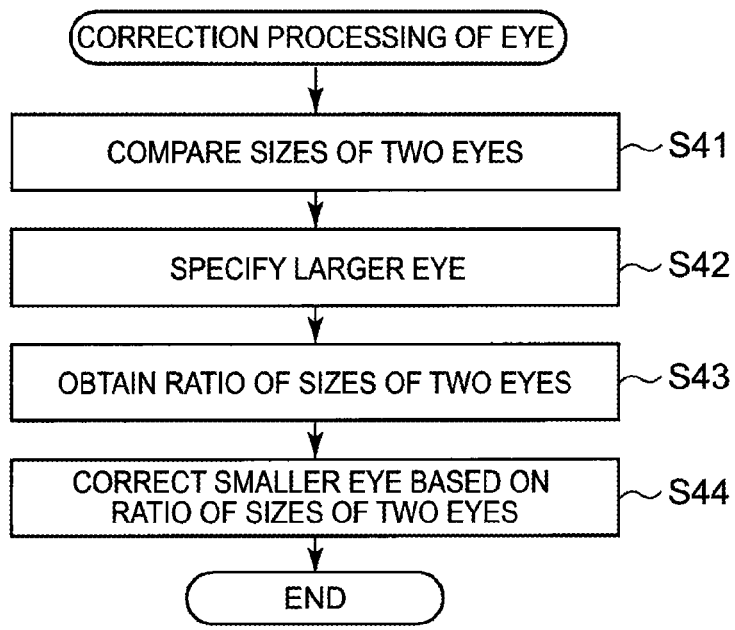

IMAGE PROCESSING APPARATUS, IMAGE PROCESSING METHOD, AND RECORDING MEDIUM RECORDING A PROGRAM

BACKGROUND OF THE INVENTION

1. Field of the Invention

The present invention relates to an image processing apparatus, an image processing method, and a recording medium recording a program.

2. Description of Related Art

The technique of deforming a face image by expanding or reducing a part of the face image for an automatic photographing apparatus outputting the face image produced by imaging the face of a subject as a print was proposed (see, for example, Japanese Patent Application Laid-Open Publication No. 2000-267156).

However, the deforming of a face image by simply expanding or reducing a part thereof as disclosed in Japanese Patent Application Laid-Open Publication No. 2000-267156 has a problem of producing an unnatural image owing to the processed part of the image being conspicuous.

BRIEF SUMMARY OF THE INVENTION

Accordingly, it is an object of the present invention to perform more natural image processing to a face image.

According to an embodiment of the present invention, there is provided an image processing apparatus, including: an obtainment section to obtain a face image; an area specifying section to specify a set of a plurality of corresponding areas in the face image obtained by the obtainment section; and a correction section to generate a face image in which one area of the plurality of corresponding areas of the face image is used as a reference to correct another area.

According to an embodiment of the present invention, there is provided an image processing apparatus, including: an obtainment section to obtain a face image; a face constituting part specifying section to specify a set of a plurality of corresponding face constituting parts in the face image obtained by the obtainment section; and a correction section to generate a face image in which one face constituting part of the plurality of corresponding face constituting parts of the face image is used as a reference to correct another face constituting part.

According to an embodiment of the present invention, there is provided an image processing method for making an image processing apparatus execute the pieces of processing including: obtaining a face image; specifying a set of a plurality of corresponding areas in the obtained face image; and generating a face image in which one are of the plurality of specified corresponding areas of the face image is used as a reference to correct another area.

According to an embodiment of the present invention, there is provided an image processing method for making an image processing apparatus execute the pieces of processing including: obtaining a face image; specifying a set of a plurality of corresponding face constituting parts in the obtained face image; and generating a face image in which one face constituting part of the plurality of specified corresponding face constituting parts of the face image is used as a reference to correct another face constituting part.

According to an embodiment of the present invention, there is provided a recording medium recording a program for making a computer installed in an image processing apparatus execute the functions including: an obtainment section to obtain a face image; an area specifying section to specify a set of a plurality of corresponding areas in the face image obtained by the obtainment section; and a correction section to generate a face image in which one area of the plurality of corresponding areas of the face image specified by the area specifying section is used as a reference to correct another area.

According to an embodiment of the present invention, there is provided a recording medium recording a program for making a computer installed in an image processing apparatus execute the functions including: an obtainment section to obtain a face image; a face constituting part specifying section to specify a set of a plurality of corresponding face constituting parts in the face image obtained by the obtainment section; and a correction section to generate a face image in which one face constituting part of the plurality of corresponding face constituting parts of the face image is used as a reference to correct another face constituting part.

BRIEF DESCRIPTION OF THE SEVERAL VIEWS OF THE DRAWINGS

FIG. 2 is a flow chart showing an example of the flow of imaging processing;

FIG. 3 is a flow chart showing an example of the flow of correction processing;

FIG. 4 is a flow chart showing an example of the flow of area specifying processing;

FIG. 5 is a flow chart showing an example of the flow of correction processing of an eye;

DETAILED DESCRIPTION OF THE INVENTION

In the following, an embodiment of the present invention will be described with reference to the accompanying drawings. However, the scope of the invention is not limited to the shown examples.

Figure 1:
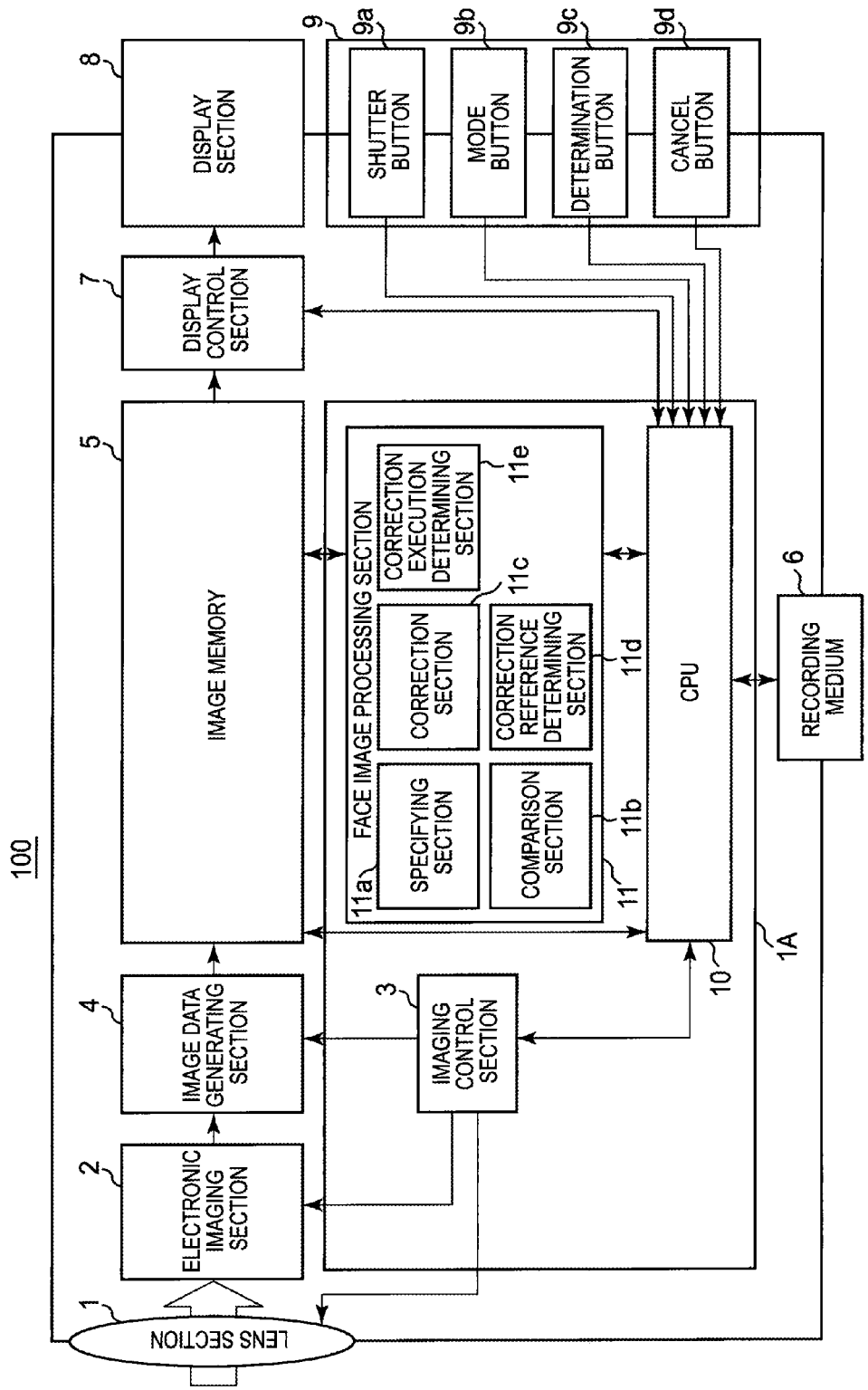
FIG. 1 is a diagram showing an example of an imaging apparatus functioning as the image processing apparatus of an embodiment to which the present invention is applied.

FIG. 1 is a diagram showing an imaging apparatus 100 functioning as the image processing apparatus of an embodiment to which the present invention is applied.

The imaging apparatus 100 functioning as the image processing apparatus obtains the image data of a face image, specifies a plurality of areas on both sides of a center line extending into a predetermined direction at almost the central part of the obtained face image as a reference, and uses one of the plurality of specified areas of the face image as a reference to correct another area.

To put it concretely, as shown in FIG. 1, the imaging apparatus 100 includes a lens section 1, an electronic imaging section 2, an imaging control section 3, an image data generating section 4, an image memory 5, a recording medium 6, a display control section 7, a display section 8, an operation input section 9, a central processing unit (CPU) 10, and a face image processing section 11.

Moreover, the imaging control section 3 and the CPU 10 are designed as, for example, a custom large scale integrated circuit (LSI) 1A together with the face image processing section 11.

The lens section 1 is composed of a plurality of lenses and includes a zoom lens, a focus lens, and the like.

Moreover, the lens section 1 may include a zoom drive section for moving the zoom lens into the optical axis direction thereof at the time of imaging a subject (see, for example, a face F shown in FIG. 7), a focusing drive section for moving the focus lens into the optical axis direction thereof at the imaging time, and the like, although the illustration of those sections are omitted.

The electronic imaging section 2 images a subject to generate the image data thereof. The electronic imaging section 2 includes an image sensor, such as a charge coupled device (CCD) or a complementary metal-oxide semiconductor (CMOS), and converts an optical image that has passed through various lenses of the lens section 1 into a two-dimensional image signal.

The imaging control section 3 includes a timing generator, a driver, and the like, although their illustration is omitted. The imaging control section 3 drives the electronic imaging section 2 to scan the electronic imaging section 2 with the timing generator and the driver, and makes the electronic imaging section 2 convert an optical image into a two-dimensional image signal every predetermined period. Then, the imaging control section 3 reads out the image frame of every screen from the imaging area of the electronic imaging section 2 to output the read-out image frame to the image data generating section 4.

Moreover, the imaging control section 3 controls the imaging conditions of a subject S, such as the settings of automatic focusing (AF) processing, automatic exposure (AE) processing, and automatic white balancing (AWB) processing, and adjusts them.

Figure 7:
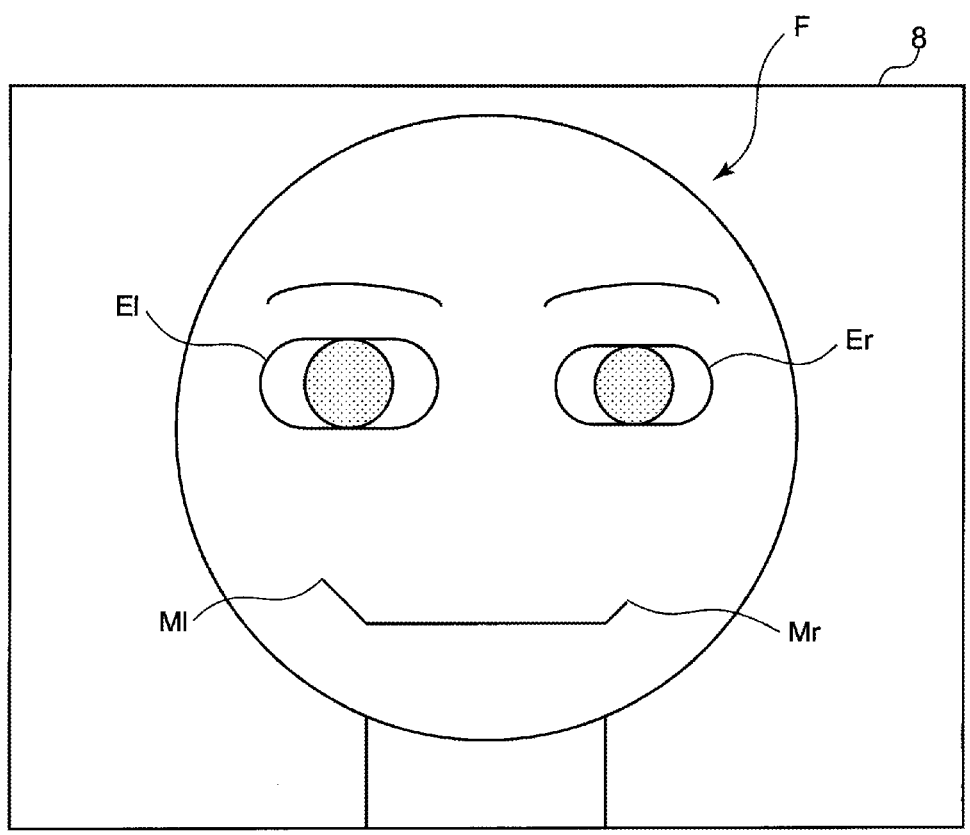
FIG. 7 is a view showing an example of a display based on the image data of a face image on a display section.

FIG. 7 is an example of displaying the image data of a face image in the display section 8.

The image data generating section 4 suitably performs the gain adjustment of each of the color components of red (R), green (G), and blue (B) of the signal having an analog value of the image frame transferred from the electronic imaging section 2. After that, the image data generating section 4 performs the sample-and-hold action of the gain-adjusted color components by the use of a sample-and-hold circuit (the illustration of which is omitted) and converts the sample-held signal into digital data by the use of an analog-to-digital (A/D) converter (the illustration of which is omitted). The image data generating section 4 further performs color process processing including pixel interpolation processing and γ correction processing with a color process circuit (the illustration of which is omitted), and after that, the image data generating section 4 generates a luminance signal Y and chrominance difference signals Cb and Cr (YUV data) having digital values.

The luminance signal Y and the chrominance difference signals Cb and Cr output from the color process circuit are transferred to the image memory 5, used as a buffer memory, by a direct memory access (DMA) transfer through a not-shown DMA controller.

The image memory 5 is composed of, for example, a dynamic random access memory (DRAM), and temporarily stores data and the like that are processed by the CPU 10, the face image processing section 11, and the like.

The recording medium 6 is composed of, for example, a nonvolatile memory (such as a flash memory), and records the recording image data of an imaged image coded by a Joint Photographic Experts Group (JPEG) compression section (the illustration of which is omitted) of the image processing section 11.

The display control section 7 performs the control of reading out displaying image data temporarily stored in the image memory 5 and image data recorded in the recording medium 6 to make the display section 8 display the read image data therein.

To put it concretely, the display control section 7 includes a video random access memory (VRAM), a VRAM controller, a digital video encoder, and the like. Then, the digital video encoder periodically reads out the luminance signal Y and the chrominance difference signals Cb and Cr which have been read-out from the image memory 5 and are stored in the VRAM (the illustration of which is omitted) from the VRAM through the VRAM controller under the control of the CPU 10. The digital video encoder then generates a video signal on the basis of these pieces of data to output the generated video signal to the display section 8.

Moreover, the display control section 7 makes the display section 8 display a correction result by the correction section 11c (described below) of the face image processing section 11.

Furthermore, the display control section 7 makes the display section 8 display the correction result and further performs confirming processing for enabling a user to confirm whether to save the displayed correction result or not. As the confirming processing, the display control section 7, for example, makes the display section 8 display a saving propriety selecting display for selecting whether to save the displayed correction result into the face image or not.

Then, a user performs an input operation through the determination button 9c or the cancel button 9d (described below) of the operation input section 9 as a selection input of whether to save the correction result or not in the saving propriety selecting processing.

The display section 8 is, for example, a liquid crystal display apparatus and displays an image imaged by the electronic imaging section 2 and the like on the display screen thereof on the basis of a video signal from the display control section 7. To put it concretely, the display section 8 displays a live view image on the basis of a plurality of image frames generated by imaging an subject by means of the lens section 1, the electronic imaging section 2, and the imaging control section 3, or a face image imaged as the main imaged image in an imaging mode.

The operation input section 9 is an input section for performing predetermined operations of the imaging apparatus 100. To put it concretely, the operation input section 9 includes a shutter button 9a for an photographing instruction of a subject, a mode button 9b for a selection instruction for selecting an imaging mode, a function, and the like on a menu screen, a zoom button (the illustration of which is omitted) for an adjustment instruction of a zoom quantity, the determination button 9c and the cancel button 9d for determining whether to perform a correction or not, and the like. The operation input section 9 outputs a predetermined operation signal in response to an operation of one of those buttons to the CPU 10.

The CPU 10 controls each section of the imaging apparatus 100. To put it concretely, the CPU 10 performs various control operations in conformity with various processing programs (the illustration of which is omitted) for the imaging apparatus 100.

The face image processing section 11 includes a specification section 11a, a comparison section 11b, the correction section 11c, a correction reference determining section 11d, and a correction execution determining section 11e.

The specification section 11a detects a face image from image data imaged and obtained in cooperation with the lens section 1, the electronic imaging section 2, and the imaging control section 3. Various methods, such as the detection based on a comparison of a face image with a predetermined template and the detection based on a contour extraction of the face image, can be adopted for the detection of the face image.

Moreover, the specification section 11a specifies a plurality of areas by the use of the center line, as a reference, extending into a predetermined direction at almost the central part of a face image obtained by means of the lens section 1, the electronic imaging section 2, and the imaging control section 3.

To put it concretely, the specification section 11a detects the face constituting parts corresponding to the two eyes in the image frame of a face image. Moreover, the specification section 11a detects the coordinates of the center of each pupil of the two eyes (for example the coordinates (Xa, Ya) and the coordinates (Xb, Yb) shown in FIG. 8). The coordinates here mean positional information to the origin (for example the origin O shown in FIG. 8) which positional information is expressed on the basis of predetermined two directions (for example the X direction and the Y direction shown in FIG. 8) perpendicular to each other to the imaging area, which origin is situated at a predetermined position of the image data of the face image. After having detected the coordinates of the centers of the respective pupils of the two eyes, the specification section 11a calculates the locus of the line segment (for example the line segment C shown in FIG. 8) passing through the intermediate point of the coordinates of the centers of he respective pupils of the detected two eyes and extending almost perpendicular to the line segment connecting the coordinates of the centers of the respective pupils of the detected two eyes. The specification section 11a sets the line segment as the center line extending into the predetermined direction at almost the central part of the face image. The specification section 11a specifies the two areas of the divided face image (for example the areas F1 and F2 shown in FIG. 8) by using the line segment as a reference.

The "set" described in the following indicates two common configurations or two areas having common configurations. For example, face constituting parts such as two eyes (for example the left eye El and the right eye Er shown in FIG. 7) and two corners of a mouth (for example the left corner Ml and the right corner Mr shown in FIG. 7), and areas of a face image which areas include one or more of these constituting parts can be cited.

Moreover, the specification section 11a specifies a set of a plurality of corresponding face constituting parts from an obtained face image as a set of a plurality of corresponding areas.

For example, the specification section 11a specifies both eyes (for example, the left eye El and the right eye Er shown in FIG. 7) as the set of the plurality of corresponding face constituting parts in a face image. The specification section 11a specifies both eyes (two eyes) by, for example, specifying the pupils or whites of the eyes existing in a face image. In this case, the specification section 11a specifies the eyes on the basis of the differences of the pixel values, the brightness, and the like between those of the pupils and the whites of the eyes and those of the peripheral areas of the face image.

Moreover, the specification section 11a obtains the information pertaining to the sizes of eyes. For example, the specification section 11a obtains the numbers of pixels of each of the respective pupils of two eyes which pixels are successive along the Y direction.

Moreover, the specification section 11a specifies the two corners of the mouth (for example the left corner Ml and the right corner Mr shown in FIG. 7) existing in a face image as a set of a plurality of corresponding face constituting parts in the face image. For example, the specification section 11a specifies the corners of the mouth on the basis of the differences of the pixel values, the brightness, and the like between the areas of a face image.

It has been supposed for convenience' sake that the eye situated on the observer's left side is expressed as the left eye El and the eye situated on the observer's right side is expressed as the right eye Er between the two eyes existing in the face image shown in FIG. 7. The left eye El is the right eye of the subject, and the right eye Er is the left eye of the subject.

Moreover, it has been supposed that the corner of the mouth situated on the observer's left side is expressed as the left corner Ml and the corner of the mouth situated on the observer's right side is expressed as the right corner Mr between the two corners of the mouth existing in the face image shown in FIG. 7. The left corner Ml is the right corner of the mouth of the subject, and the right corner Mr is the left corner of the mouth of the subject.

Moreover, the specification section 11a obtains the information pertaining to the positions of the two corners of a mouth. In the case of the face image shown in FIG. 8, the specification section 11a obtains the coordinates (Y1 and Y2) of the two corners of the mouth which coordinates pertain to the Y direction.

Moreover, the specification section 11a obtains the information pertaining to the position of the lowermost end of a mouth as the information pertaining to the positions of the two corners of the mouth. "The most lower end portion of a mouth" here indicates the farther end of the mouth from the eyes between the ends of the mouth with respect to the direction of a center line (for example the line segment C shown in FIG. 8) extending in the predetermined direction at almost the central part of a face image. In the case of the face image shown in FIG. 8, the specification section 11a obtains the coordinate (Y3) in the Y direction pertaining to the position of the lowermost end of the mouth shown in FIG. 8.

The comparison section 11b compares each of a set of two corresponding face constituting parts existing in a face image and being specified by the specification section 11a, and outputs a judgment result based on a predetermined condition.

For example, the comparison section 11b compares the sizes of two eyes specified by the specification section 11a as a set of a plurality of corresponding face constituting parts. To put it concretely, the comparison section 11b, for example, compares the number of pixels of the respective pupils of the two eyes which pixels are successive along the Y direction and have been obtained by the specification section 11a. Then, the comparison section 11b specifies the eye the number of pixels of which is relatively larger. Moreover, the comparison section 11b obtains the ratio of the sizes of two eyes. For example, the comparison section 11b calculates the ratio of the numbers of the pixels of the respective pupils of the two eyes which pixels are successive along the Y direction, and the comparison section 11b sets the calculated ratio as the ratio of the sizes of the two eyes.

Although the present embodiment compares and specifies the sizes of eyes on the basis of the numbers of the pixels of their pupils which pixels are successive along the Y direction, the sizes of eyes may be compares by other methods. For example, the comparison may be performed on the basis of the maximum values of the numbers of the pixels of the respective whites of each of the two eyes which pixels are successive along the X direction; the sizes of eyes may synthetically be compared and judged on the basis of both of the numbers of the pixels of their pupils which pixels are successive along the Y direction and the numbers of the pixels of the respective whites of the two eyes which pixels are successive along the X direction; the numbers of pixels constituting the respective pupils and the whites of the two eyes may be compared with each other.

Moreover, the comparison section 11b compares the positions of the two corners of a mouth specified by the specification section 11a as a set of a plurality of corresponding face constituting parts. For example, the comparison section 11b calculates the positions of the coordinates of the respective two corners of a mouth which coordinates concern the Y direction as the positions of the corners of the mouth which positions of the corners have been obtained as the corners of the mouth to the position indicated by the coordinates in the Y direction which coordinates have been obtained as the information pertaining to the position of the lowermost end of the mouth. Then, the comparison section 11b compares the calculated positions of the respective two corners of the mouth with each other, and judges which position of the corners of the mouth is higher. Then, the comparison section 11b specifies the corner of the mouth the position of which is higher than that of the other between the two corners of the mouth.

The correction section 11c uses one of the two areas of the face image specified by the specification section 11a as a reference to generate a face image in which the other area is corrected.

Figure 8:
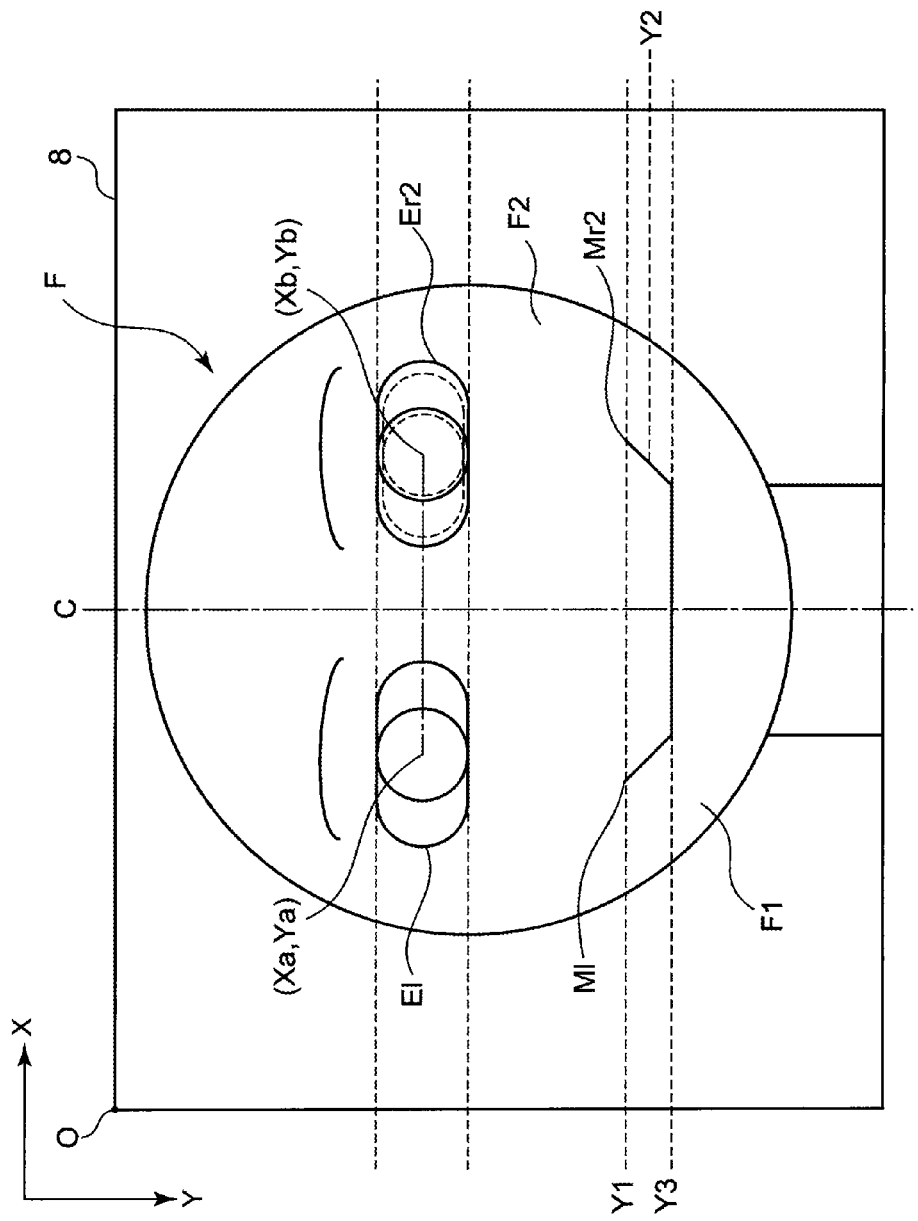
FIG. 8 is a view showing an example of a display based on the image data of the face image after a correction.

FIG. 8 shows an example of the image data of a face image after a correction. In FIG. 8, the half-tone dot meshing of the parts of the pupils in FIG. 7 is omitted in order to clarify the correction result of the size of an eye.

To put it concretely, the correction section 11c uses one of the two face constituting parts in a face image as a reference which parts have been specified by the specification section 11a to correct the other face constituting part. For example, the correction section 11c uses one eye as a reference to correct the other eye.

In the example shown in FIG. 8, one eye (the left eye El shown in FIGS. 7 and 8) is used as the reference to correct the size of the imaging area of the other eye (the right eye Er shown in FIG. 7), and the other eye after the correction is shown as the right eye Er2. To put it concretely, the correction section 11c sets the eye specified by the comparison section 11b as the larger one as the one eye, and corrects the size of the other eye smaller in size than that of the one eye by expanding the size of the other eye to be almost the same as that of the one eye. Here, the correction section 11c corrects the size of the other eye in order that the sizes of the two eyes in their width directions along the Y direction may be almost equal to each other on the basis of the ratio of the numbers of the pixels of the respective pupils of the two eyes which pixels are successive along the Y direction and have been calculated by the comparison section 11b.

Moreover, the correction section 11c, for example, uses one corner of a mouth as a reference to correct the other corner of the mouth.

In the example shown in FIG. 8, the correction section 11c sets the corner of the mouth which corner has been specified by the comparison section 11b as the corner the position of which is higher than that of the other corner (the left corner Ml shown in FIGS. 7 and 8) as the one corner, and corrects the coordinate of the other corner of the mouth (the right corner Mr shown in FIG. 7) which coordinate concerns the Y direction so as to be aligned with the coordinate of the one corner which coordinate concerns the Y direction. In FIG. 8, the other corner of the mouth after the correction is shown as the right corner Mr2.

The correction reference determining section 11d determines the face constituting parts that are used as the references of the corrections by the correction section 11c on the basis of a predetermined condition.

If "the eye specified by the comparison section 11b as larger one is set as the one eye used as the reference of correction" is, for example, used as the predetermined condition, the correction reference determining section 11d receives an input of a specification result by the comparison section 11b and determines the one eye of the correction reference.

Similarly, if "the corner of a mouth which corner has been specified by the comparison section 11b as the one the position of which is higher than that of the other corner is set as the one corner of the mouth which corner is used as the reference of correction" is, for example, used as the predetermined condition, the correction reference determining section 11d receives an input of a specification result and determines the one corner of the mouth of the correction reference.

The correction execution determining section 11e determines whether to save a correction result by the correction section 11c or not on the basis of the content of a selection input received by the determination button 9c and the cancel button 9d of the operation input section 9. To put it concretely, if the determination button 9c is operated to a saving propriety confirming display for selecting whether to save a correction result displayed on the display section 8 by the display control section 7 or not, the correction execution determining section 11e outputs the image data corresponding to the displayed correction result to the JPEG compression section of the image processing section 11. Hereby, the image data of a face image subjected to a correction by the correction section 11c is recorded in the recording medium 6. On the other hand, if the cancel button 9d is operated to a dialog display for selecting whether to save the displayed correction result or not, the correction execution determining section 11e discards the displayed correction result.

Next, an image processing method executed by the imaging apparatus 100 will be described with reference to FIGS. 2 to 6.

FIG. 2 is a flow chart showing an example of the flow of imaging processing.

First, the lens section 1 operates to be focused on a subject (for example the face F; see FIG. 7), and the electronic imaging section 2 images the subject under the control of the imaging control section 3 to generate image data (Step S1). After that, the specification section 11a of the face image processing section 11 detects a face image from the image data obtained by the processing at Step S1 (Step S2). Then, the face image processing section 11 performs correction processing to the face image (Step S3).

Here, the correction processing will be described with reference to the flow chart of FIG. 3.

First, the specification section 11a performs area specifying processing (Step S11).

Here, the area specifying processing will be described with reference to FIG. 4.

In the area specifying processing, the specification section 11a detects the face constituting parts corresponding to the two eyes in the image frame of the face image (Step S31).

Moreover, the specification section 11a detects the coordinates of the centers of the respective pupils of the two eyes (Step S32). Then, the specification section 11a calculates the locus of a first line segment (for example the line segment C shown in FIG. 8) almost perpendicular to a second line segment at the intermediate point thereof which second line segment connects the coordinates of the centers of the two pupils to each other. The specification section 11a specifies the first line segment as the center line extending into the predetermined direction at almost the central part of the face image (Step S33). The specification section 11a divides the face image into left and right areas (for example the areas F1 and F2 shown in FIG. 8) by using the center line as a reference (Step S34). With that, the area specifying processing ends.

After the area specifying processing, the specification section 11a further specifies face constituting parts (for example two eyes and the two corners of a mouth) that exist in each of the two left and right areas in common (Step S12). The specification section 11a specifies eyes and a mouth on the basis of, for example, differences of pixel values, brightness, and the like between the eyes and the mouth and the peripheral areas of the face image. Moreover, the specification section 11a obtains the coordinates indicating the information pertaining to the sizes of the two eyes and the coordinates indicating the information pertaining to the positions of the two corners of the mouth (Step S13). The specification section 11a, for example, obtains the numbers of the pixels of the respective pupils of the two eyes which pixels are successive along the Y direction. Moreover, the specification section 11a, for example, obtains the coordinates (Y1 and Y2) of the two corners of the mouth which coordinates concern the Y direction, and the coordinate (Y3) pertaining to the position of the lowermost end of the mouth shown in FIG. 8 which coordinate (Y3) concerns the Y direction (see FIG. 8).

After the processing at Step S13, the face image processing section 11 performs the correction processing of an eye (Step S14).

Here, the correction processing of an eye will be described with reference to FIG. 5.

The comparison section 11b compares the sizes of the two eyes to each other on the basis of the information pertaining to the sizes of the two eyes which information has been obtained by the processing at Step S13 (Step S41). Then, the comparison section 11b specifies the larger eye (Step S42). To put it concretely, the comparison section 11b, for example, compares the numbers of the pixels of the respective pupils of the two eyes with each other which pixels are successive along the Y direction. Then, the comparison section 11b specifies the eye in which the number of the pixels thereof is relatively larger.

Moreover, the comparison section 11b obtains the ratio of the sizes of the two eyes (Step S43). The comparison section 11b, for example, calculates the ratio of the numbers of the pixels of the respective pupils of the two eyes which pixels are successive along the Y direction, and specifies the calculated ratio as that of the sizes of the two eyes.

After the processing at Step S43, in order that the size of the one eye in the width direction thereof which eye has been specified as the larger one by the processing at Step S42 may be almost the same as that of the other eye in the width direction, the correction section 11c corrects the other eye, that is, the smaller eye, by enlarging the eye on the basis of the ratio of the sizes of the two eyes calculated by the comparison section 11b by the processing at Step S43 (Step S44) (see FIG. 8). With that, the correction processing of an eye ends.

After the correction processing of an eye, the face image processing section 11 performs the correction processing of a corner of the mouth (Step S15).

Figure 6:
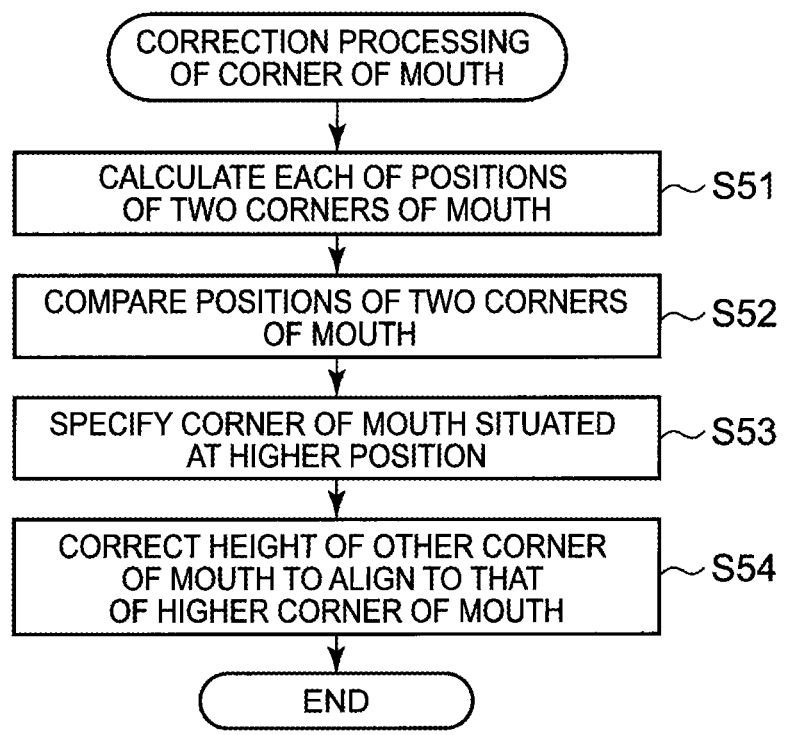
FIG. 6 is a flow chart showing an example of the flow of correction processing of a corner of a mouth.

Here, the correction processing of a corner of the mouth will be described with reference to FIG. 6.

The comparison section 11b calculates each of the positions of the two corners of the mouth on the basis of the information pertaining to the positions of the two corners of the mouth obtained by the processing at Step S13 (Step S51). Then, the comparison section 11b compares the positions of the two corners of the mouth to each other (Step S52), and specifies the corner of the mouth the position of which is higher than that of the other corner of the mouth (Step S53).

After the processing at Step S53, the correction section 11c uses the corner specified as the one situated at the higher position by the processing at Step S53 to correct the position of the other corner of the mouth so as to align the position with that of the higher corner (Step S54) (see FIG. 8). With that, the correction processing of a corner of the mouth ends.

After the correction processing of a corner of the mouth, the display control section 7 displays the correction results by the correction section 11c (Step S16). Moreover, the display control section 7 performs a saving propriety confirming display for selecting whether to save the displayed correction results or not (Step S17). After that, the CPU 10 waits for an input operation of the determination button 9c or the cancel button 9d of the operation input section 9 to the saving propriety confirming display displayed by the processing at Step S17 (Step S18: NO).

When an input operation of the determination button 9c or the cancel button 9d of the operation input section 9 has been performed to the saving propriety confirming display by the processing at Step S17 (Step S18: YES), the correction execution determining section 11e judges whether an input operation to the determination button 9c of the operation input section 9 has been performed or not (Step S19). If the input operation of the determination button 9c of the operation input section 9 has been performed (Step S19: YES), the correction execution determining section 11e outputs the image data corresponding to the displayed correction results to the JPEG compression section of the image processing section 11 (Step S20). On the other hand, if it is judged that no input operations of the determination button 9c of the operation input section 9 have been performed in the processing at Step S19 (Step S19: NO), that is, if the cancel button 9d has been operated, the correction execution determining section 11e discards the displayed correction results (Step S21) and outputs the image data of the face image before the corrections to the JPEG compression section of the image processing section 11. After the processing at Step S20 or S21, the correction processing ends.

After the end of the correction processing, the recording medium 6 records the image data coded by the JPEG compression section of the image processing section 11 (Step S4). With that, the processing ends.

Although the flow chart of FIG. 2 describes the correction processing of a face image obtained by the imaging thereof by the processing at Step S1, the correction processing can be performed not only at the time of imaging the face image. For example, the correction processing can be performed to the image data of a face image already stored in the recording medium 6.

Moreover, although the flow chart of FIG. 2 automatically performs the correction processing to the image data of an imaged face image, the configuration enabling the previous setting of whether to automatically perform a correction of a face image immediately after the imaging thereof or not may be adopted. For example, the following method can be cited in which the setting of whether to automatically perform a correction of a face image immediately after the imaging thereof or not is determined before the imaging thereof on the basis of an input operation of the determination button 9c or the cancel button 9d of the operation input section 9, or the like. The determined setting of whether to automatically perform a correction of a face image immediately after the imaging thereof or not may be recorded into a storage device, such as the recording medium 6, to be held therein.

As described above, according to the imaging apparatus 100 of the present embodiment, the lens section 1, the electronic imaging section 2, and the imaging control section 3 obtain a face image; the specification section 11a of the face image processing section 11 specifies a set of a plurality of corresponding areas; and the correction section 11c of the face image processing section 11 uses one of the specified plurality of areas of the face image as a reference to generate a face image in which the other area is corrected.

That is, because the one area of the face image constitutes the face image in the natural state thereof subjected to no corrections, a correction result of the other area subjected to the correction can be made to be one giving a natural impression by using the one area as a reference to correct the other area. As described above, the imaging apparatus 100 can perform more natural image processing to a face image.

Moreover, the specification section 11a specifies each of a set of a plurality of corresponding face constituting parts (for example eyes and the corners of a mouth), and the correction section 11c uses one of the plurality of specified face constituting parts as a reference to correct the other face constituting part.

Hereby, it becomes possible to correct a face image by correcting a face constituting part without correcting the whole area of the face image. Consequently, the processing load of the correction can be reduced as compared to that in the case of correcting one area of the face image. Moreover, a local correction of a face image can be performed by correcting a face constituting part of the face image.

Moreover, the specification section 11a specifies each of the eyes each existing in each of the two areas of a face image as each of a plurality of face constituting parts, and the correction section 11c uses one of the specified two eyes as a reference to correct the other eye.

Hereby, because the eye (the other eye) of the face image can be corrected on the basis of the one, the correction result of the eye can be made to be the one giving a natural impression.

Moreover, the correction reference determining section 11d sets a larger eye of two eyes as the one eye used as the correction reference, and the correction section 11c corrects the size of the other eye on the basis of the size of the one eye. Thereby, the size of the relatively smaller other eye can be aligned with the size of the relatively larger one. Generally, a face image having large eyes gives an expressive and cheerful impression, and consequently a face image can beautifully be seen as one giving an expressive and cheerful impression as compared to that in the case of performing no corrections by correcting the smaller eye on the basis of the larger eye.

Moreover, the specification section 11a specifies each of the corners of a mouth each existing in each of the two areas of a face image as the two face constituting parts, and the correction section 11c uses one of the specified two corners of the mouth as a reference to correct the other corner.

Hereby, by using the one corner of the mouth as a reference, the corner of the mouth (the other corner of the mouth) of the face image can be corrected, and consequently the correction result of the corner of the mouth can be made to be one giving a natural impression.

Moreover, the correction reference determining section 11d determines one of a set of a plurality of corresponding areas to be used as a correction reference of a correction by the correction section 11c on the basis of a predetermined condition.

Hereby, one area to be used as a correction reference can easily be determined.

For example, an eye and a corner of a mouth to be used as correction references can automatically be determined by using the predetermined conditions "the eye specified as the larger one by the comparison section 11b is used as the one eye of a correction reference" and "the corner of a mouth specified by the comparison section 11b as the one situated at a higher position is used as the one corner of a correction reference," both of which have been shown in the above embodiment. In this case, because the correction processing of a face image can be automatized, the correction processing of the face image can be performed without imposing troublesome operations upon a user.

Moreover, the display control section 7 makes the display section 8 display a correction result by the correction section 11c of the face image processing section 11. Then, the correction execution determining section 11e determines whether to save a correction by the correction section 11c or not on the basis of the content of a selection input received with the determination button 9c and the cancel button 9d of the operation input section 9.

Hereby, a user can perform the decision making of whether to perform a correction of a face image or not after ascertaining the correction result of the face image.

The configuration of the imaging apparatus 100 shown in the above embodiment is only one example of those of the imaging apparatus 100 and 100A, and the configurations are not limited to the above-shown one. The present invention is not limited to the above embodiment, and various improvements and changes of the design of the embodiment may be performed without departing from the scope and sprit of the present invention.

<Modification>

Figure 9:
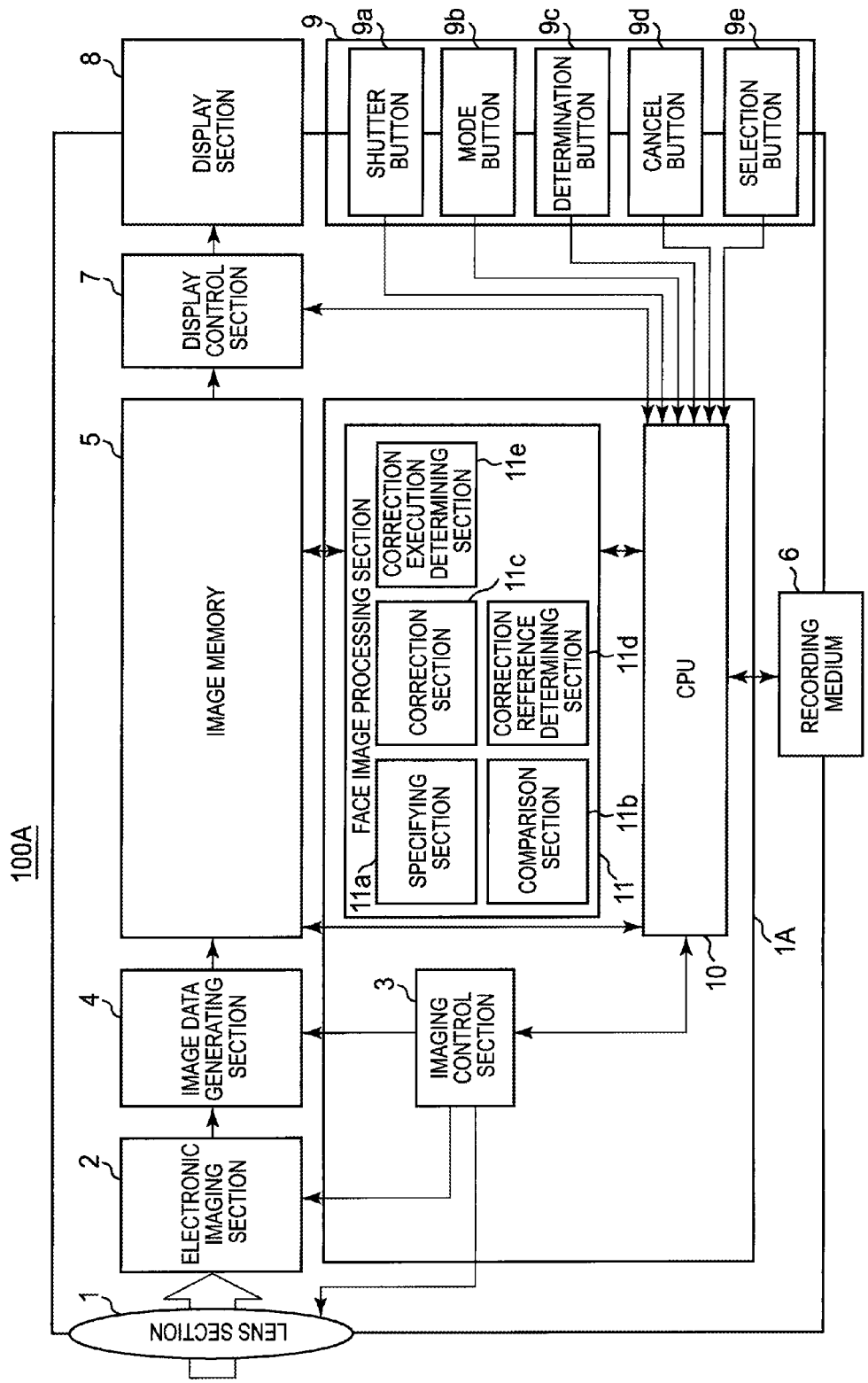
FIG. 9 is a diagram showing an example of a modification of the imaging apparatus.

FIG. 9 is a diagram showing a modified imaging apparatus 100A.

The modified operation input section 9 thereof further includes a selection button 9e for a designation input of a face constituting part to which a correction is performed.

The correction section 11c determines the face constituting part to be corrected on the basis of the content of a designation input with the selection button 9e of the operation input section 9.

To put it concretely, the selection button 9e of the operation input section 9 receives a designation input of the kind of a face constituting part to which a correction by the correction section 11c is performed among two or more sets of a plurality of corresponding face constituting parts, that is, two or more kinds of sets of a plurality of corresponding face constituting parts (for example, eyes and the corners of a mouth) specified by the specification section 11a. At this time, the display section 8 may display the face image to be corrected to enable a user to ascertain the face image to determine the kind of the face constituting part to which a correction is performed.

Figure 10:
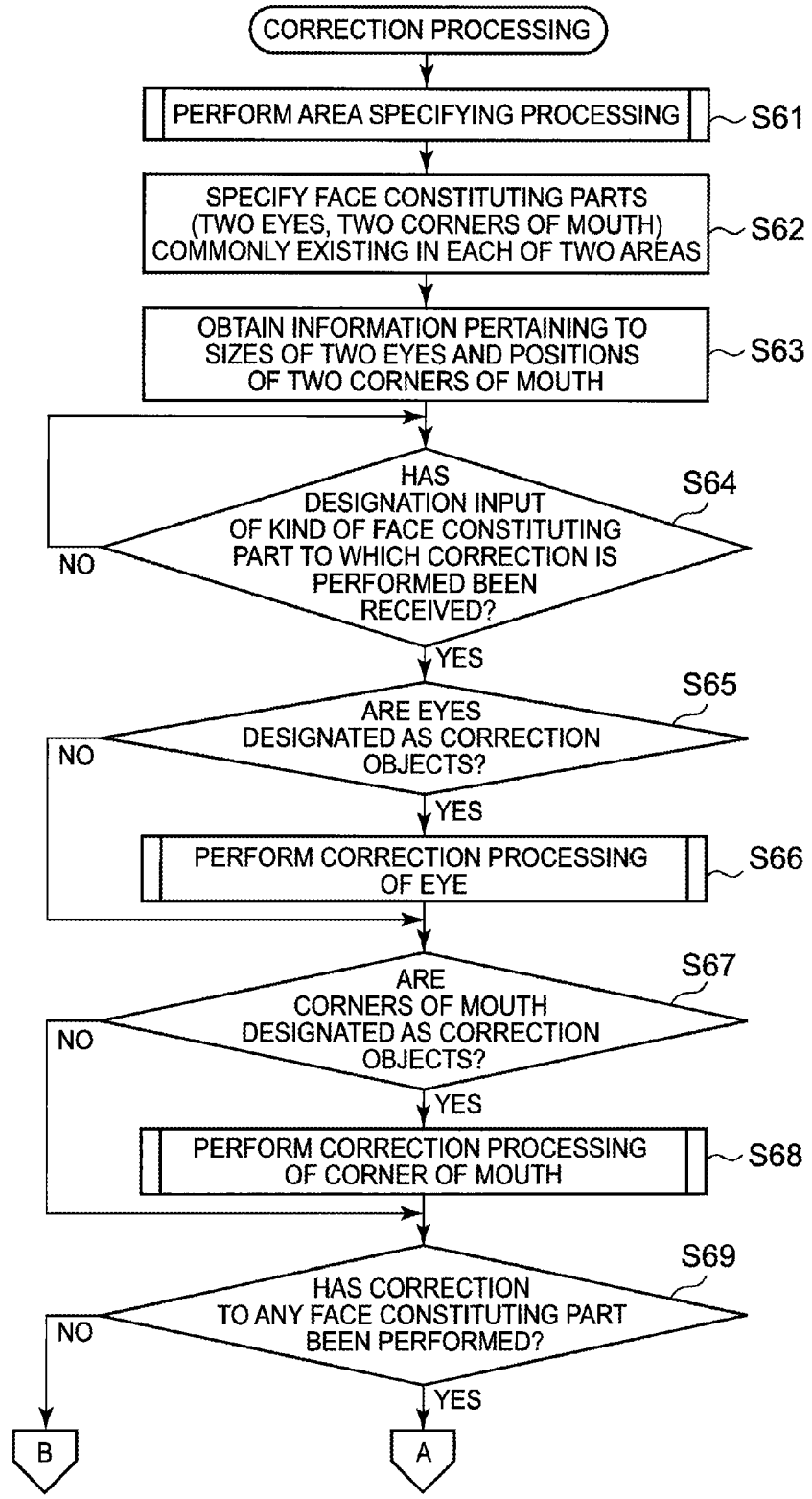
FIG. 10 is a flow chart of an example of the flow of correction processing of the modification.
Figure 11:
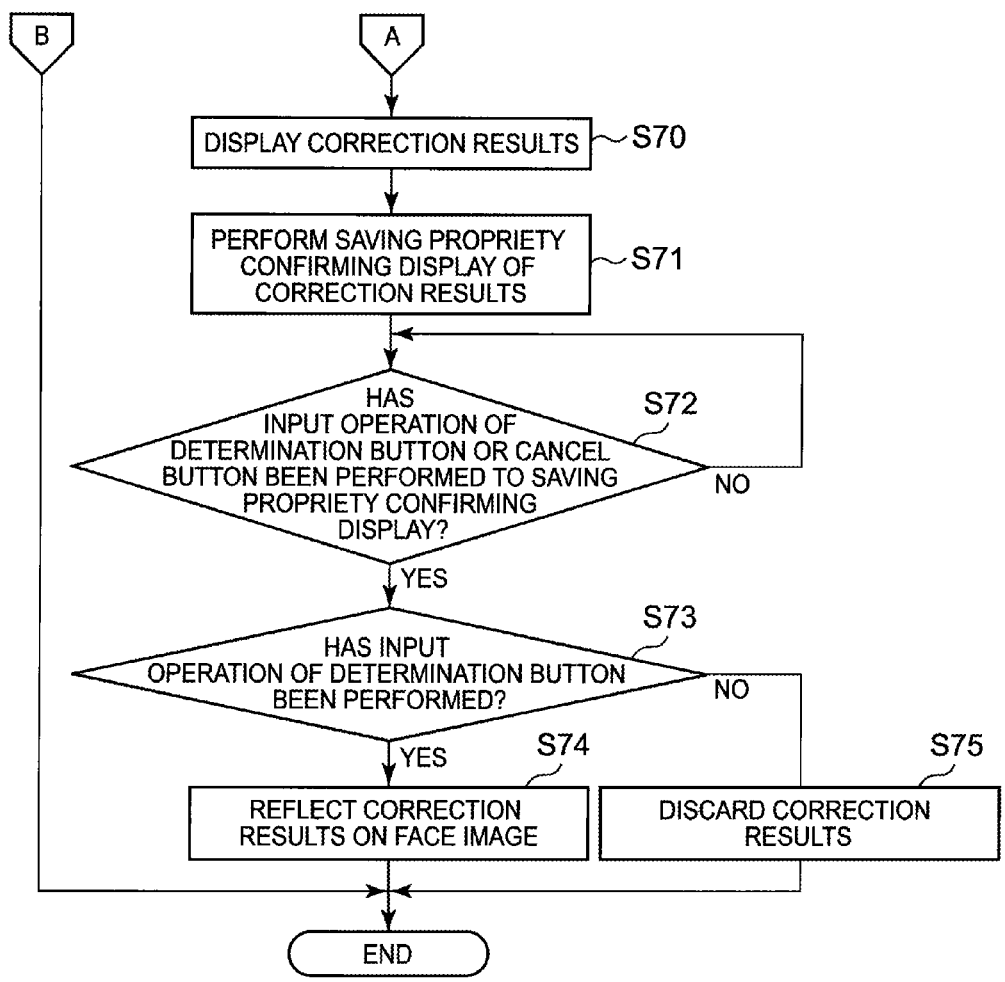
FIG. 11 is a flow chart showing the continuation of the flow of FIG. 10.

The correction processing of the modification will be described with reference to the flow charts of FIGS. 10 and 11.

First, the specification section 11a performs area specifying processing (Step S61).

After the area specifying processing, the specification section 11a specifies face constituting parts (for example two eyes and the two corners of a mouth) each existing in each of the two areas (Step S62). The specification section 11a specifies the eyes and the corners of the mouth on the basis of, for example, differences of pixel values, brightness and the like between the eyes and the mouth and their peripheral areas of the face image. Moreover, the specification section 11a obtains the coordinates indicating the information pertaining to the sizes of the two eyes, the information pertaining to the position of the lowermost end of the mouth, and the information pertaining to the positions of the two corners of the mouth (Step S63). The specification section 11a, for example, obtains the numbers of the pixels of the respective pupils of the two eyes which pixels are successive along the Y direction as the information pertaining to the sizes of the two eyes. Moreover, the specification section 11a, for example, obtains the coordinate (Y3) of the position of the lowermost end of the mouth shown in FIG. 8 which coordinate (Y3) pertains to the Y direction and the coordinates (Y1 and Y2) of the two corners of the mouth which coordinates (Y1 and Y2) pertain to the Y direction as the information pertaining to the position of the lowermost end of the mouth and the information pertaining to the positions of the corners of the mouth.

After the processing at Step S63, the face image processing section 11 waits for the selection button 9e of the operation input section 9 to receive a designation input of a kind of the face constituting part to which a correction by the correction section 11c is performed between the two kinds of face constituting parts (eyes and the corners of a mouth) specified by the specification section 11a (Step S64: NO). When the selection button 9e receives a designation input of the kind of the face constituting part to which a correction by the correction section 11c is performed (Step S64: YES), the CPU 10 judges whether an eye is designated as a correction object or not (Step S65). If the eye is designated as the correction object (Step S65: YES), the face image processing section 11 performs the correction processing of an eye (Step S66).

After the correction processing of an eye or if it is judged that an eye is not designated as a correction object at Step S65 (Step S65: NO), the CPU 10 judgers whether a corner of a mouth is designated as a correction object or not (Step S67). If it is judged that the corner of a mouth is designated as a correction object (Step S67: YES), the face image processing section 11 performs the correction processing of a corner of a mouth (Step S68).

After the correction processing of a corner of a mouth or if it is judged that a corner of a mouth is not designated as a correction object at Step S67 (Step S67: NO), the CPU 10 judges whether a correction of any face constituting part by the correction section 11c has been performed or not (Step S69). If no corrections have been performed to any face constituting parts by the correction section 11c (Step S69: NO), the correction execution determining section 11e outputs the image data of a face image to the JPEG compression section of the image processing section 11 and ends the correction processing.

If it is judged that a correction of any face constituting part by the correction section 11c has been performed at Step S69 (Step S69: YES), the display control section 7 displays the correction result by the correction section 11c (Step S70). Moreover, the display control section 7 performs a saving propriety confirming display for selecting whether to save the displayed correction result or not (Step S71). After that, the CPU 10 waits for an input operation of the determination button 9c or the cancel button 9d of the operation input section 9 to the saving propriety confirming display displayed by the processing at Step S71 (Step S72: NO).

When the input operation of the determination button 9c or the cancel button 9d of the operation input section 9 has been performed to the saving propriety confirming display displayed by the processing at Step S71 (Step S72: YES), the correction execution determining section 11e judges whether the input operation has been performed to the determination button 9c of the operation input section 9 or not (Step S73). If it has been judged that the input operation has been performed to the determination button 9c of the operation input section 9 (Step S73: YES), the correction execution determining section 11e outputs the image data corresponding to the displayed correction result to the JPEG compression section of the image processing section 11 (Step S74). On the other hand, if it has been judged that no input operations have been performed to the determination button 9c of the operation input section 9 at Step S73 (Step S73: NO), that is, if the cancel button 9d has been operated, the correction execution determining section 11e discards the displayed correction result (Step S75) and outputs the image data of the face image before the correction to the JPEG compression section of the image processing section 11. After the processing at Step S74 or S75, the correction processing ends.

As described above, according to the modification, the face constituting part to which a correction by the correction section 11c is performed among the two or more kinds of the face constituting parts specified by the specification section 11a is determined according to the content of an input operation by a user to the selection button 9e.

Hereby, a correction can be performed to a face constituting part that a user desires, and a correction result of the face image that a user desires can easily be obtained.

As another modification, the correction reference determining section 11d may have the function of determining an area of a correction reference in accordance with a selection result of a user. In this case, for example, the display control section 7 makes the display section 8 display a face image obtained by the electronic imaging section 2 and the imaging control section 3. Then, a designation input of a user concerning which one of the two areas (for example two eyes or the two corners of a mouth) of the face image displayed in the display section 8 is used as the one area of a correction reference is received on the basis of designation input content to the selection button 9e or the like of the operation input section 9. The correction reference determining section 11d determines one area of a correction reference in accordance with the received designation input content.

One eye of a correction reference is not limited to larger one, but may be smaller one. Moreover, one corner of a mouth of a correction reference is not limited to the one situated at a higher position, but may be one situated at a lower position.

If the correction reference determining section 11d has the function of determining an area of a correction reference in accordance with a selection result of a user, the information pertaining to one area of a correction reference selected by a user may be recorded by the recording medium 6. At this time, the modification may be configured as follows: a user name and a selection result of the user may be associated with each other, and when the user uses the imaging apparatus 100 or 100A after that, the user can read out the selection result associated with the user name only by designating or selecting the user name.

By providing the function of determining a correction reference in accordance with a user's selection result to the correction reference determining section 11d, the user can designate a favorite face constituting part as a reference among the two areas of a face image and the face constituting parts existing in the respective two areas. Hereby, because the other face constituting part is corrected on the basis of the user's favorite face constituting part, the corrected face image becomes closer to the user's favorite. That is, a correction result of a face image that a user desires can easily be obtained.

The image processing apparatus of the present invention is not limited to the imaging apparatus 100 and 100A. For example, the image processing apparatus may be configured to obtain the image data of a face image from external equipment to perform a correction of the face image.

Moreover, although eyes and the corners of a mouth have been exemplified as face constituting parts in the above embodiment and modifications, face constituting parts (for example eyebrows) other than the eyes and the corners of the mouth may be specified to be corrected.

Moreover, a correction of a face image is not limited to the corrections of the size of an eye and the position of a corner of a mouth. For example, the shape or the color of a face constituting part, such as an eye or a mouth, or the shape or the color of one of the two areas of a face image may be corrected. Moreover, three or more areas may be set. For example, the generation of a face image in which the skin color of the area of a forehead is used as a reference to correct the skin colors of other areas (for example both cheeks) of the face image can be cited.

Moreover, the method of specifying an eye or a corner of a mouth is not limited to the described content of the embodiment and the modifications. For example, the method of extracting the contour of a face constituting part to be specified can be cited. Moreover, only the pixels in an extracted contour may be treated as a face constituting part, and a square area including a contour may be treated as a face constituting part.

Moreover, a face image may be divided to the left and the right, and, for example, the face image on the left side may be used as a reference to correct the face image on the right side. Or, a reversed image of a face image on either the left or the right may be generated, and a correction may be performed so as to generate bilaterally symmetric face images.

Moreover, the processing of dividing a face image into two parts may be omitted, and the specification section 11a may be configured to specify a set of two corresponding face constituting parts.

Moreover, although the correction results by the correction section 11c are displayed in the above embodiment and the modifications, the display processing may be omitted and the correction results may automatically be saved.

Moreover, as for a correction of a face image, the correction section 11c may generate a plurality of correction results different from each other and may display each of the plurality of correction results. Then, one of the plurality of correction results that has been selected by a user may be saved. As an example of showing a plurality of correction results, the following case can be cited: showing both of a correction result of the case of performing a correction by expanding a smaller eye on the basis of a larger eye and a correction result of the case of performing a correction by reducing a larger eye on the basis of a smaller eye.

By generating a plurality of correction results different from each other to provide options of a correction result to be saved, it becomes easy to reflect a correction result that is more favorite one for a user, and a corrected face image becomes closer to a user's favorite. That is, a correction result of a face image that a user desires can more easily be obtained.

The extent of a correction may be changed according to the inclination of a face image. For example, if a face image is imaged from the right direction toward the front of the face of a subject, the area and the size of the face constituting part on the right side of the face image are larger in comparison with those on the left side, and a correction for balancing the face image in the state of imaging the face image from the right direction may accordingly be performed.

In addition, although the above embodiment is configured to be realized by a drive by the face image processing section 11 under the control of the CPU 10, the configuration is not limited to the above one, but the configuration may be realized by the execution of a predetermined program and the like by the CPU 10.

That is, a program memory (the illustration of which is omitted) for storing a program previously stores a program including an obtainment processing routine, an area specifying processing routine, a face constituting part specification processing routine, and a correction processing routine. Then, the CPU 10 may be functioned to obtain a face image by the obtainment processing routine. Moreover, the CPU 10 may be functioned to specify a set of a plurality of corresponding areas in the obtained face image by the area specifying processing routine. Moreover, the CPU 10 may be functioned to specify a set of a plurality of corresponding face constituting parts in the obtained face image by the face constituting part specification processing routine. Moreover, the CPU 10 may be functioned to generate a face image in which one of a plurality of corresponding areas specified by an area specifying section or one of a plurality of specified corresponding face constituting parts in a face image is used as a reference and the other of the plurality of corresponding areas or the plurality of corresponding face constituting parts is corrected by the correction processing routine.

The entire disclosure of Japanese Patent Application No. 2010-139026 filed on Jun. 18, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus, comprising:
    an obtainment section to obtain a face image;
    a specifying section to specify a set of a plurality of corresponding face constituting parts in the face image obtained by the obtainment section; and
    a deformation section to align a size or a position of one of the face constituting parts with a size or a position of another one of the face constituting parts, among the plurality of corresponding face constituting parts specified by the specifying section.

2. The image processing apparatus according to claim 1, further comprising:
    a determination section to determine said another one of the face constituting parts as a reference for a deformation performed by the deformation section among the plurality of corresponding face constituting parts specified by the specifying section, based on a predetermined condition.

3. The image processing apparatus according to claim 2, further comprising:
    a deformation reference designation receiving section to receive a designation input of said another one of the face constituting parts as the reference for the deformation performed by the deformation section among the plurality of corresponding face constituting parts specified by the area specifying section, wherein the determination section determines said another one of the face constituting parts as the reference for the deformation performed by the deformation section based on a content of the designation input received by the deformation reference designation receiving section.

4. The image processing apparatus according to claim 2, wherein:

the specifying section specifies both of two eyes in the face image as the set of the plurality of corresponding face constituting parts;

the determination section determines one eye having a larger size among the two eyes specified by the specifying section as the reference for the deformation; and the deformation section aligns the size of another eye with the size of the eye determined as the reference by the determination section.

5. The image processing apparatus according to claim 1, wherein:

the specifying section specifies both of the two eyes in the face image as the set of the plurality of corresponding face constituting parts, and the deformation section aligns the size of one eye with the size of another eye among the two eyes specified by the specifying section.

6. The image processing apparatus according to claim 1, wherein:

the specifying section specifies two corners of a mouth in the face image as the set of the plurality of corresponding face constituting parts, and the deformation section aligns a position of one corner of the mouth with a position of another corner of the mouth among the two corners of the mouth specified by the specifying section.

7. The image processing apparatus according to claim 1, further comprising:

a deformation object designation receiving section to receive a designation input of face constituting parts for deformation by the deformation section among two or more sets of a plurality of corresponding face constituting parts specified by the specifying section, wherein the deformation section aligns a size or a position of one of the face constituting parts with a size or a position of another one of the face constituting parts, among the plurality of corresponding face constituting parts designated for deformation by the designation input received by the deformation object designation receiving section.

8. The image processing apparatus according to claim 1, further comprising:

a face center line calculation section to calculate a face center line which (i) passes through an intermediate point between coordinates of centers of two eyes in the face image obtained by the obtaining section, and (ii) is perpendicular to a line segment connecting the coordinates of the centers of the two eyes.

9. An image processing method for an image processing apparatus, the method comprising:

obtaining a face image;

specifying a set of a plurality of corresponding for constituting parts in the obtained face image; and generating a face image in which a size or a position of one of the face constituting parts is aligned with a size or a position of another one of the face constituting parts, among the specified plurality of corresponding face constituting parts.

10. A non-transitory computer-readable recording medium recording a program that is executable by a computer in an image processing apparatus to execute the functions comprising:

obtaining a face image;

specifying a set of a plurality of corresponding face constituting parts in the obtained face image; and generating a face image in which a size or a position of one of the face constituting parts is aligned with a size or a position of another one of the face constituting parts, among the specified plurality of corresponding face constituting parts.

* * * * *